G. W. HUTCHINSON.
AUTOMATIC NOTCH FINDER.
APPLICATION FILED APR. 30, 1912.

1,037,257.

Patented Sept. 3, 1912.

Witnesses:—
Charles R. Crompton.
Fred Pohl.

Inventor.
G. W. Hutchinson.
By Gordon Marks
Attorney.

UNITED STATES PATENT OFFICE.

GEORGE WILLIAM HUTCHINSON, OF WALTON, WAIKATO, AUCKLAND, NEW ZEALAND.

AUTOMATIC NOTCH-FINDER.

1,037,257.

Specification of Letters Patent.

Patented Sept. 3, 1912.

Application filed April 30, 1912. Serial No. 694,251.

*To all whom it may concern:*

Be it known that I, GEORGE WILLIAM HUTCHINSON, a citizen of the Dominion of New Zealand, and resident of Walton, Waikato, in the Provincial District of Auckland, in the Dominion of New Zealand, have invented certain new and useful Improvements in Automatic Notch-Finders, of which the following is a specification.

The invention relates to quadrant racks employed to secure an adjustable lever in position; such levers are usually provided with a sliding pawl which engages in one or other of a plurality of notches in the periphery of a quadrant for the purpose of maintaining the lever in position. There are many kinds of machines upon which apparatus of this sort is employed, and in some of them, particularly agricultural implements, the lever is constantly being shifted, and it is necessary to return it to its original position as expeditiously as possible. In plows, for instance, the plow-man, when turning at the end of the "lands", operates the lever for the purpose of lifting the share from the furrow. The lever is also operated when a mound or other obstruction is met with.

By my invention the keeping pawl upon the lever may be made to fall into the desired notch with very little trouble to the operator.

I shall describe my invention as applied to a plow, but little, modification is required to adapt it to levers of other agricultural implements and for the like purposes on other machines. According hereto, a spring returned bracket is adapted to slide radially with and, is adjustable relatively to, the quadrant rack. A roller carried by a pawl sliding upon the lever engages a projection having an inclined face and moves the bracket against the action of a spring the pressure upon the pawl tends to force it into the notch.

I will now further describe my invention by the aid of the accompanying drawings wherein:—

Figure 1:
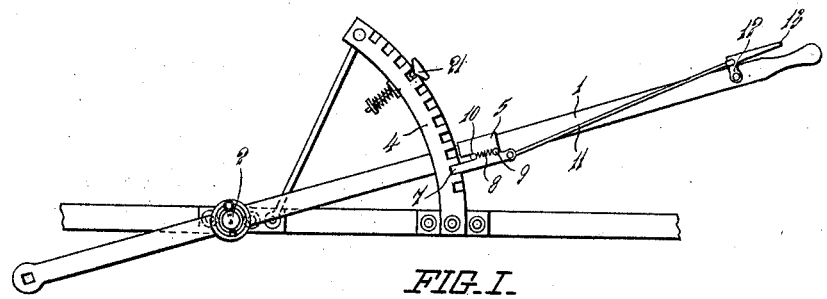
Figure 2:
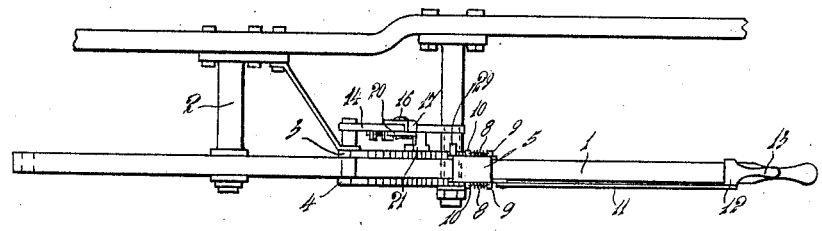
Figure 4:
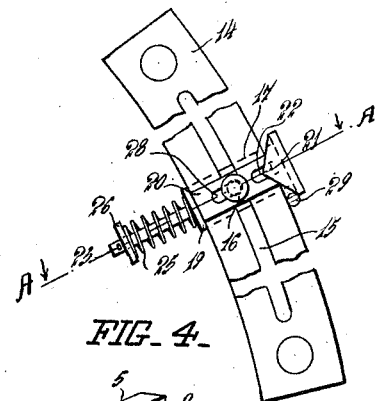
Figure 3:
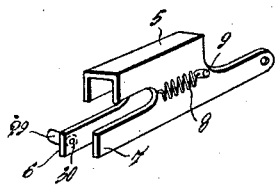
Figure 5:
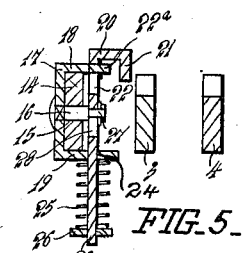

Figure 1 is a side elevation, and Fig. 2, a plan of a lever and parts. Fig. 3, an end perspective elevation of a pawl bracket. Fig. 4, a side elevation of a quadrant bracket and slide piece. Fig. 5, a cross section on A—A Fig. 4, and, Fig. 6, a similar view illustrating a modification.

The lever 1 is fulcrumed at its lower end at 2 and is vibratable between a quadrant rack comprised of two exactly corresponding parts 3 and 4 the opposing notches of which are simultaneously engaged by a pawl slidable upon the lever. In the illustration this pawl comprises a pawl bracket 5 partially surrounding and slidable upon the lever, projections 6 and 7 engaging in the notches of the respective parts of the quadrant rack.

Springs 8 one upon either side of the bracket secured at one end to pins 9 projecting from the bracket and at the other end to a pin 10 respectively projecting from the lever 1 normally tend to draw the pawl bracket toward the quadrant rack.

A rod 11 pivotally connected at one end to the pawl bracket is connected at its other end to a bell crank lever 12 one arm of which consists of a thumb piece, 13 which under pressure causes the bell crank lever to turn upon its pivot, and thereby to draw up the pawl bracket and release the projections referred to from the notches in the quadrant rack. A quadrant bracket 14 of similar radius and co-axial with the quadrant rack has a guide slot 15, struck from the same center as the quadrant bracket, which receives a bolt 16 by which a bracket 17 having the ears 18 and 19 is secured in any desired position on the quadrant bracket. A slide piece 20 has the hooked end 21, a slot 22 which receives a pin 22ª projecting from and integral with ear 18. A stem 23 of the slide piece passes through a guide hole 24 in ear 19, and has upon it the compression spring 25 bearing against a washer 26.

The bolt 16 has a reduced end 27 which is received by a longitudinal slot 28 in the slide piece. The bottom of the hooked end of the slide piece inclines toward the middle from each side and a roller 29 mounted upon a pin 30 projecting from the pawl bracket 5 is adapted to engage with the slide piece when the lever is vibrated in either direction and to slide it outwardly against the action of the spring 25, the pressure due thereto being exerted upon the pawl bracket and tending to force the pawl projections into the notches of the quadrant rack which are immediately in radial line with the hooked end of the slide piece.

Figure 6:
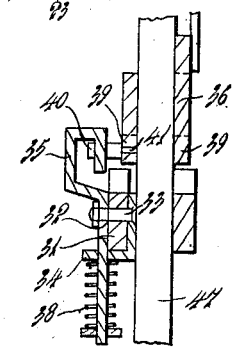

I have shown an independent quadrant for the slide piece to work upon, but it may be employed directly upon a quadrant rack as shown in Fig. 6 wherein the quadrant rack 31 has the arc guide slot 32 receiving the bolt 33 by which a bracket 34 receiving the hooked slide piece 35 and acting as a guide therefor is secured in position. A pawl bracket 36 sliding upon the lever 47 is acted upon by a spring 38 in the manner previously described and is also operated in the same way and by similar parts.

Projections 39 from the pawl bracket engages in one or other of the notches of the quadrant rack and a roller 40 journaled upon a pin 41 projecting from the pawl bracket engages beneath the hooked end of the slide piece in the manner and for the purpose previously described.

What I do claim and desire to secure by Letters Patent of the United States is:—

1. In combination, a quadrant rack, a slide piece, means for adjusting same relatively to the quadrant a spring acting upon the slide piece, a lever, a pawl bracket slidable thereon, a projection from the pawl bracket adapted to engage the slide piece, substantially as and for the purpose herein specified and illustrated in the drawing.

2. In combination, a quadrant rack, a quadrant bracket, co-axial therewith and corresponding thereto, a lever, a pawl bracket slidable thereon, a projecting pawl, a slide piece, means for adjusting same relatively to the quadrant bracket, a spring, a projection from the slide piece and a projection from said pawl bracket adapted to engage the projection from the slide piece, substantially as and for the purpose herein specified and illustrated in the drawing.

3. In apparatus of the nature indicated, a quadrant rack, a slide piece sliding radially therewith and adjustable relatively to the notches in the quadrant rack, a spring acting upon the slide piece, a projection from the slide piece having an inclined under face, a lever, a pawl slidable thereon and adapted to engage the notches in the quadrant and a projection from the pawl adapted to engage the projection from the slide piece, substantially as and for the purpose herein specified and illustrated in the drawing.

In testimony whereof I have signed my name to this specification in the presence of two witnesses.

GEORGE WILLIAM HUTCHINSON.

Witnesses:
ARTHUR LEWITT FERNEYHOUGH,
FLORA ELIZABETH MILNE WILSON.